UNITED STATES PATENT OFFICE.

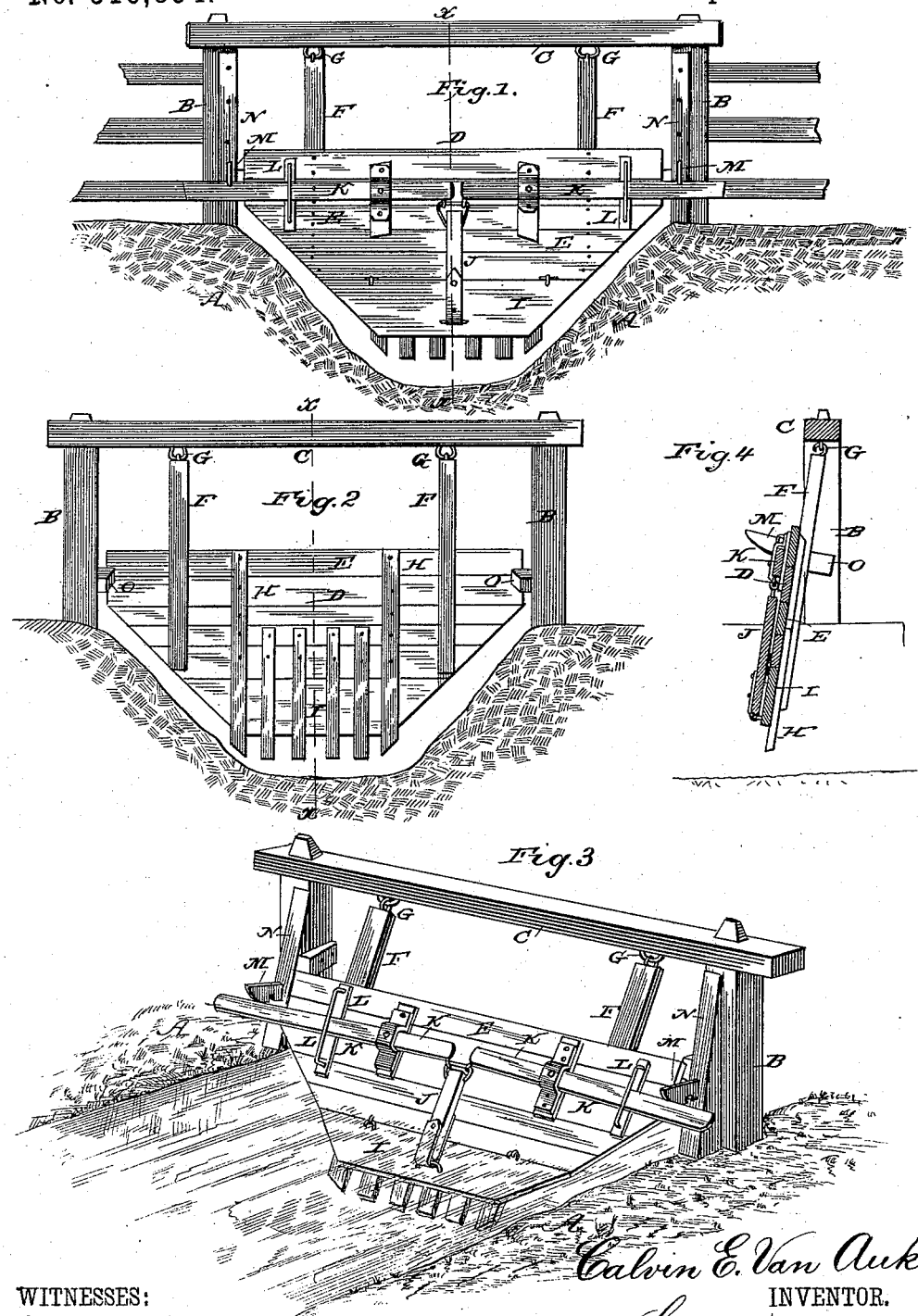

CALVIN EVERETT VAN AUKEN, OF PLEASANT LAKE, INDIANA.

FLOOD-FENCE.

SPECIFICATION forming part of Letters Patent No. 316,854, dated April 28, 1885.

Application filed January 27, 1885. (No model.)

*To all whom it may concern:*

Be it known that I, C. E. VAN AUKEN, a citizen of the United States, and a resident of Pleasant Lake, in the county of Steuben and State of Indiana, have invented certain new and useful Improvements in Water-Gates; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view showing the gate closed. Fig. 2 is a rear view showing the gate closed. Fig. 3 is a perspective view showing the gate partially open, and Fig. 4 is a vertical sectional view taken on the lines $x\ x$ in Figs. 1 and 2.

The same letters refer to the same parts in all the figures.

This invention relates to water-gates for ditches and other water-courses at points where they would be crossed by fences; and it has for its object to provide a simple and reliable swinging gate which will not obstruct or interrupt the flow of the water, nor of any drift carried thereby, and which shall be provided with a simple and reliable latch, which, while adapted to be operated automatically by the action of the water, shall effectually prevent hogs and other animals from passing through the gate at times when there is no water in the ditch.

With these ends in view the invention consists in the improved construction and arrangement of parts, which will be hereinafter fully described, and particularly pointed out in the claims.

In the drawings hereto annexed, A A designate the sides of a ditch to which my improved water-gate is applied.

At each side of said ditch is a vertical post or upright, B, which may be end posts of a fence crossing the land which is intersected by the ditch. The upper ends of the said posts are connected by a cross-piece or cap, C, to the under side of which the gate is hinged or suspended. The said gate, which is designated by letter D, is constructed of boards or planks E E, bolted of otherwise secured to a pair of swinging arms, F F, the upper ends of which are connected to the under side of the cap-piece C by means of staples G G, or in any other suitable manner that will insure a free swinging motion. The ends of the planks forming the body of the gate are cut off slantingly, as shown, in such a manner as to conform to the inclined sides of the ditch, in such a manner, however, that it will easily swing clear of the sides of the ditch.

To the rear side of the body of the gate are secured a series of vertical parallel slats, H H, extending nearly to the bottom of the ditch, so as not to interfere with the flow when the water is low in the ditch.

To the lower edge of the body of the gate, at the front side of the latter, is hinged a trap-door, I, which normally rests upon the slats H H, but which, when the water rises in the ditch, will swing in an outward or forward direction. The lower edge of the front side of the trap I is connected by a pivoted or hinged rod, J, with the inner ends of a pair of latch-arms, K K, which are suitably pivoted to the front side of the gate. The outer ends of said latch-arms work in staples or keepers L L, and are arranged to engage the beveled catches M M, which are secured to the front sides of the posts A A. The inner sides of the latter are provided with stops or buffers O O, which, when the gate is at rest, support it in a slightly-inclined position.

From the foregoing description, taken in connection with the drawings hereto annexed, the operation and advantages of this invention will be readily understood. When the ditch is dry, the latches will hold the gate securely, and the slats H upon the rear side of the gate will prevent animals from pushing the trap-door, and thus opening the gate. When the water rises in the ditch, the trap-door, partly by the current and partly by floating, will be raised, thus releasing the latches by the intermediate pivoted or hinged connecting rod or rods, and enabling the gate to swing to the position shown in Fig. 3 of the drawings, or to any position to which it is capable of swinging. When the water recedes, the latches will automatically engage their respective catches.

Having thus described my invention, I claim and desire to secure by Letters Patent of the United States—

1. In a water-gate, the combination of the posts or uprights, a cap connecting the same, a swinging gate hinged to the under side of the said cap-piece, a trap-door hinged to the lower front edge of the said gate, latches pivoted to the front side of the said gate and engaging beveled catches upon the front sides of the posts, and a pivoted or hinged rod connecting the inner ends of the latch-arms with the lower front edge of the trap-door, substantially as and for the purpose set forth.

2. A swinging water-gate suspended from the under side of a horizontal cap-piece, and having a series of vertical slats secured to its rear side and extending nearly to the bottom of the ditch, in combination with a trap-door hinged to the lower front edge of said gate and normally resting upon said slats, latch-arms pivoted to the front side of the gate and adapted to engage beveled catches upon the front sides of the posts, and a pivoted or hinged rod connecting the lower front edge of said trap-door with the inner ends of the pivoted latch-arms, substantially as and for the purposes herein set forth.

3. The combination of the posts, the cap-piece connecting the same, the swinging gate hinged to the under side of said cap-piece, and having downward-extending vertical slats on its rear side, a trap-door hinged to the lower front edge of said gate and resting normally upon the said slats, beveled catches secured to the front sides of the posts, buffer-blocks upon the inner sides of the posts, latch-arms pivoted upon the front sides of the gate and adapted to engage the beveled catches, and a pivoted or hinged rod connecting the inner ends of the said latch-arms with the lower front edge of the trap-door, all arranged and operating substantially as and for the purpose herein shown and specified.

In testimony that I claim the foregoing as my own I have hereunto affixed my signature in presence of two witnesses.

CALVIN EVERETT VAN AUKEN.

Witnesses:
 HARMAN FREYGANG,
 WILLIAM KILLEN SHEFFER.